United States Patent [19]

Spindler

[11] Patent Number: 5,756,992
[45] Date of Patent: May 26, 1998

[54] BLACKBODY SIMULATING APPARATUS FOR CALIBRATING AN INFRARED IMAGING DEVICE

[75] Inventor: Jeffrey William Spindler, Ridgecrest, Calif.

[73] Assignee: The United States of America as represented by the Secretary of the Navy, Washington, D.C.

[21] Appl. No.: 700,642

[22] Filed: Jul. 25, 1996

[51] Int. Cl.⁶ .................................................. G12B 13/00
[52] U.S. Cl. ................................. 250/252.1; 250/504 R
[58] Field of Search ........................ 250/252.1, 493.1 A, 250/504 R

[56] References Cited

U.S. PATENT DOCUMENTS

| | | | |
|---|---|---|---|
| 4,317,042 | 2/1982 | Bartell | 250/493 |
| 4,433,924 | 2/1984 | Quinn, III | 374/2 |
| 4,864,146 | 9/1989 | Hodges et al. | 250/504 |
| 4,967,091 | 10/1990 | Fair et al. | 250/504 R |
| 4,975,573 | 12/1990 | Girard | 250/252.1 |
| 5,010,251 | 4/1991 | Grinberg et al. | 250/332 |
| 5,083,252 | 1/1992 | McGuire | 362/293 |
| 5,466,943 | 11/1995 | Green et al. | 250/493.1 |

OTHER PUBLICATIONS

W.A. Pliskin, "Calibration of Spectrophotometers," IBM Technical Disclosure Bulletin, vol. 12, No., Jun. 1969.

*Primary Examiner*—Constantine Hannaher
*Attorney, Agent, or Firm*—Melvin J. Sliwka; David S. Kalmbaugh

[57] ABSTRACT

A blackbody simulating apparatus which has a blackbody simulator for emitting infrared energy in random directions. A collimator collects a portion of the infrared radiation emitted by the blackbody simulator and then redirects the infrared radiation as a collimated beam of infrared energy to a dielectric. The dielectric has a thin metallic coating affixed to its rear surface to form a mirror like surface at its rear surface. A primary reflection of the collimated beam of infrared energy occurs at the front surface of the dielectric resulting in a first blackbody image being directed to an infrared imager. A portion of the collimated beam passes through the dielectric to the metallic coating and is then reflected by the metallic coating to the front surface of the dielectric emerging from the dielectric as a second blackbody image which is also directed to the infrared imager. Additional blackbody images are generated by internal reflections within the dielectric with each blackbody image having a different intensity from the other blackbody images. This results in at least two different radiance levels being supplied to the infrared imager for calibrating the infrared imager.

11 Claims, 2 Drawing Sheets

BLACKBODY SIMULATING APPARATUS FOR CALIBRATING AN INFRARED IMAGING DEVICE

BACKGROUND OF THE INVENTION

1. Field of the Invention

The present invention relates generally to blackbody simulators. More specifically, the present invention relates to a blackbody simulating apparatus which generates a plurality of apparent temperature outputs at different temperatures simultaneously for calibrating the responsivity of an infrared imaging device.

2. Description of the Prior Art

A blackbody is an idealized object which may absorb all electromagnetic radiation impacting it or may be considered as a radiation source which is generally heated to increase its radiated energy. The total emission of radiant energy from a blackbody is expressed by the Stefan-Boltzmann law, which states that the total electromagnetic emission of a blackbody is proportional to the fourth power of its absolute temperature. The spectral energy distribution of the radiant energy emitted by a blackbody is expressed by Planck's radiation formula. Planck's radiation formula indicates that a blackbody which has a temperature between about 50 degrees Kelvin and 3,000 degrees Kelvin will emit electromagnetic radiation principally in the infrared region. This temperature range encompasses the temperatures at which most non-nuclear physical phenomena occur.

A blackbody is an idealized concept. A blackbody simulator is a device designed to simulate the physical properties of the idealized blackbody. A blackbody simulator is of great use in infrared research and development as well as manufacturing. For instance, it may be used to provide a source of infrared radiation of a known radiance level and a known spectral distribution. It may be used to provide a source of infrared radiation for the adjustment or testing of infrared components, assemblies or systems.

Further, more than one blackbody simulator may be used to produce a plurality of different radiance levels simultaneously to calibrate the responsivity and linearity of infrared imagers. The infrared imagers which may be calibrated using a blackbody simulator include infrared cameras, infrared search and track systems for aircraft, ships and land based vehicles, infrared radiometers and infrared missile seekers. These systems often have a linear range of up to four orders of magnitude. Their linear range can be changed by means of filters and attenuators. However, to date, a blackbody simulator which is adapted to generate the multiple different radiance levels needed for calibrating an infrared imager has not been developed.

Therefore, it is an object of the present invention to provide a fairly simple yet highly efficient blackbody simulating apparatus which generates a plurality of radiance levels simultaneously for calibrating the responsivity and linearity of an infrared imaging device.

It is another object of the present invention to provide a blackbody simulating apparatus comprising a blackbody simulator of the cavity type with sufficient emissivity and a controlled, accurately measured temperature which may be used to calibrate infrared imaging devices.

Various other advantages and objectives of the present invention will become apparent to those skilled in the art as a more detailed description of the present invention is set forth below.

SUMMARY OF THE INVENTION

The present invention overcomes some of the disadvantages of the prior art including those mentioned above in that it comprises a relatively simple yet highly efficient and economical blackbody simulating apparatus for calibrating an infrared imaging device such as an infrared camera or a missile. The blackbody simulating apparatus of the present invention comprises a blackbody simulator which is a cavity type blackbody simulator. The blackbody simulator emits infrared radiation or energy in random directions from its cavity. A collimator, positioned downstream from the blackbody simulator along a first optical path, collects a portion of the infrared radiation emitted by the blackbody simulator and then redirects the infrared radiation as a collimated beam of infrared energy along a second optical path to a dielectric. The dielectric, which has the shape of a plate, has a thin metallic coating affixed to its rear surface to form a mirror like surface at its rear surface.

A primary reflection of the collimated beam of infrared energy occurs at the front surface of the dielectric. This primary reflection results in a first blackbody image being directed to the infrared imager to calibrate the infrared imager. A portion of the collimated beam passes through the dielectric to the metallic coating and is then reflected by the metallic coating to the front surface of the dielectric emerging from the dielectric as a second blackbody image which is also directed to the infrared imager being calibrated. Additional blackbody images are generated by internal or secondary reflections within the dielectric. Each of the blackbody images provided by the dielectric are displaced from the other blackbody images and each of the blackbody images has a different intensity from the other blackbody images. This results in at least two different radiance levels being supplied by the blackbody simulating apparatus of the present invention to the infrared imager to calibrate the infrared imager.

DETAILED DESCRIPTION OF THE PREFERRED EMBODIMENT

Figure 1:
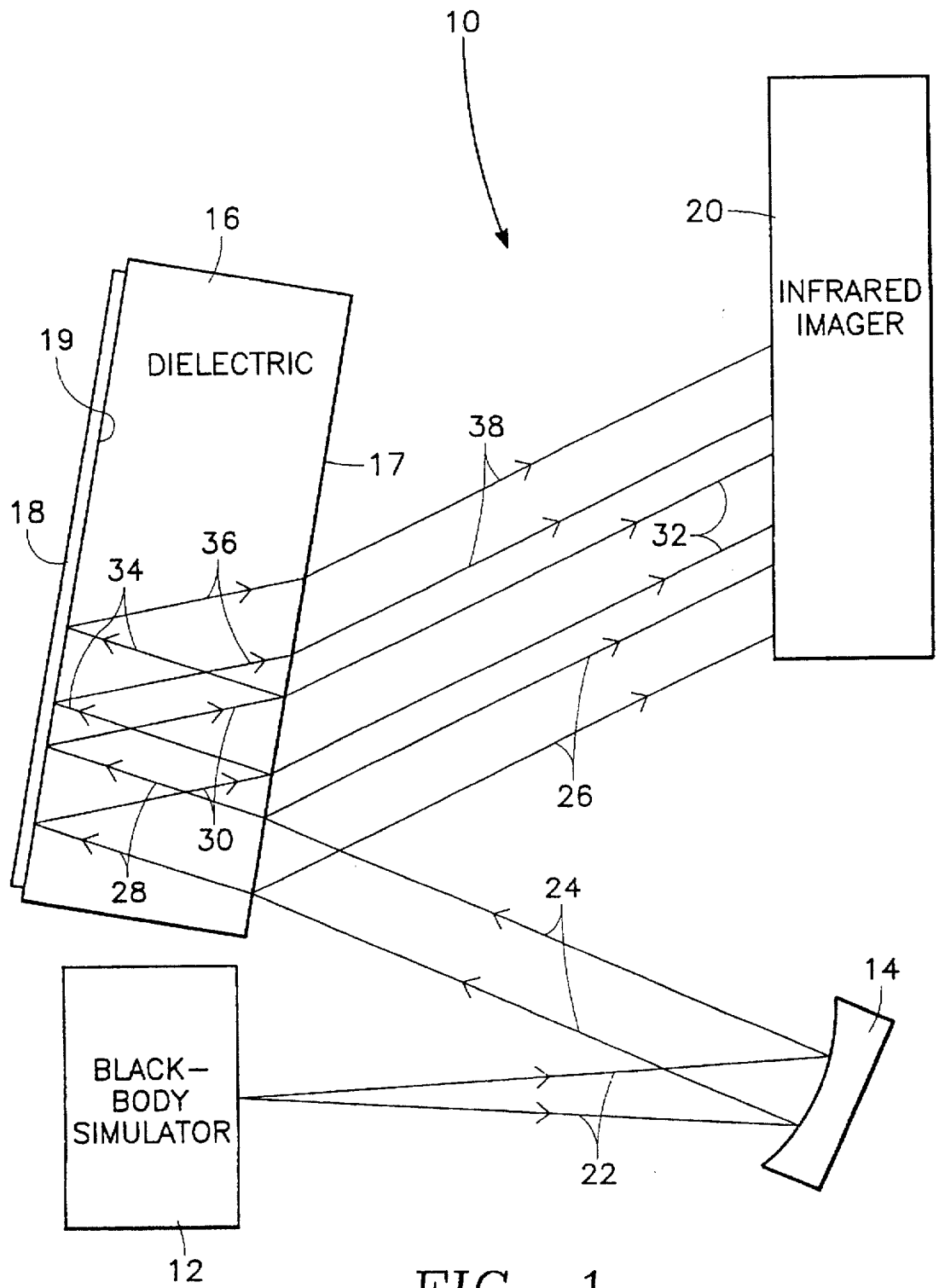
FIG. 1 is a schematic diagram illustrating the blackbody simulating apparatus for calibrating an infrared imaging device which constitutes the present invention.

Referring first to FIG. 1, there is shown a blackbody simulating apparatus (designated generally by the reference numeral 10) which is used to calibrate an infrared imager device 20 such an infrared camera, an infrared search and track system, an infrared radiometer or an infrared missile seeker. The infrared imager 20 being calibrated is sensitive to electromagnetic radiation in some part of the 1 to 20 micron wavelength which is in the infrared region of the electromagnetic spectrum. Blackbody simulating apparatus 10 calibrates infrared imager 20 by generating a plurality of different radiance levels simultaneously. The temperature range over which the blackbody simulating apparatus 10 operates may be from about 10 degrees Centigrade to about 50 degrees Centigrade to represent common ambient radiance levels or at temperatures up to 2000 degrees Centigrade to represent high temperature combustion processes.

Blackbody simulating apparatus 10 includes a blackbody simulator 12 which is ideally of the cavity type since a cavity type blackbody simulator has a high emissivity, thermal stability and a relatively compact emitting area. Positioned downstream from blackbody simulator 12 along a first optical path is a collimator 14. Blackbody simulator 12 emits infrared radiation or energy in random directions from its cavity. A portion of the infrared radiation (designated by the reference numeral 22) is directed toward collimator 14. Collimator 14 collects the portion of infrared radiation 22 directed towards collimator 14 by blackbody simulator 12 and then redirects the infrared radiation (now designated by the reference numeral 24) as a collimated beam of infrared radiation along a second optical path to a dielectric 16. Collimated beam 24 comprises a plurality of substantially parallel rays of infrared energy.

Dielectric 16 may comprise an infrared transmitting material such as germanium, silicon or a zinc selenide material having a front surface 17 which is parallel to its rear surface 19. Dielectric 16 may be in the shape of a plate with a dielectric constant of greater than one and preferably between 1.5 and 2.5 to provide for adequate transmissivity at the front surface 17 of dielectric 16. There is affixed to the rear surface 19 of dielectric 16 a thin coating of a reflective material 18 which forms a mirror like surface and which may be, for example, aluminum or gold.

A primary reflection of collimated beam 24 occurs at surface 17 of dielectric 16 resulting in a collimated beam 26 of infrared radiation being directed along a third optical path towards infrared imager 20. A portion 28 of beam 24 is refracted through dielectric 16 to the mirror like surface of coating 18 where a second reflection occurs resulting in a collimated beam 30 of infrared energy being directed to the front surface 17 of dielectric 16.

A reflection of collimated beam 30 occurs at surface 17 of dielectric 16 resulting in a collimated beam 34 of infrared radiation being directed towards coating 18. A portion 32 of beam 30 is refracted from front surface 17 of dielectric 16 to infrared imager 20 which is the second collimated beam of infrared radiation directed to infrared imager 20 as shown in FIG. 1.

A reflection of collimated beam 34 occurs at coating 18 resulting in a collimated beam 36 of infrared radiation which is directed to the front surface of dielectric 17. The refracted portion 38 of beam 36, which is directed to infrared imager 20, is the third collimated beam of infrared radiation directed to infrared imager 20.

Each of the collimated beams 26, 32 and 38 has an intensity which is different from the other collimated beams 26, 32 or 38 resulting in three separate blackbody images being supplied to infrared imager 20 by blackbody simulating apparatus 10 for calibrating infrared imager 20. Each blackbody image, in turn, is a different radiance level to infrared imager 20.

A fourth collimated beam of infrared radiation to be supplied to infrared imager 20 may be generated by blackbody simulating apparatus 10 in the identical manner that blackbody simulating apparatus 10 generates beams 32 and 38.

In addition, since the intensity of each beam 26, 32 and 38 depends on the angle of dielectric plate 16, a motor or manual adjuster (not illustrated) may be used to rotate dielectric plate 16 changing the radiance levels received by infrared imager 20. Use of a motor or manual adjuster with blackbody simulating apparatus 10 allows for rapid variations in the radiance levels received by infrared imager 20, thus increasing the efficiency of blackbody simulating apparatus 10.

When infrared imager 20 has a linear response, the blackbody simulating apparatus needs to provide at least two different radiance levels to infrared imager 20 to calibrate imager 20. The first radiance level supplied to infrared imager 20 should be near the lower end of the imager's temperature range, while the second radiance level should be near the upper end of the imager's temperature range. For a non-linear imager, blackbody simulating apparatus 10 needs to supply at least three radiance levels to infrared imager 20 for calibrating imager 20.

Figure 2:
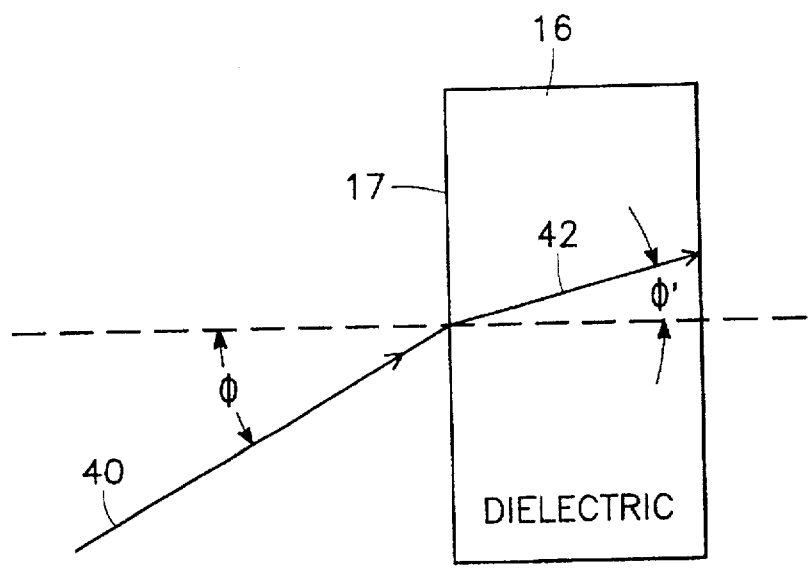
FIG. 2 illustrates infrared radiation which is incident on and partially transmitted through the dielectric of FIG. 1.
Figure 3:
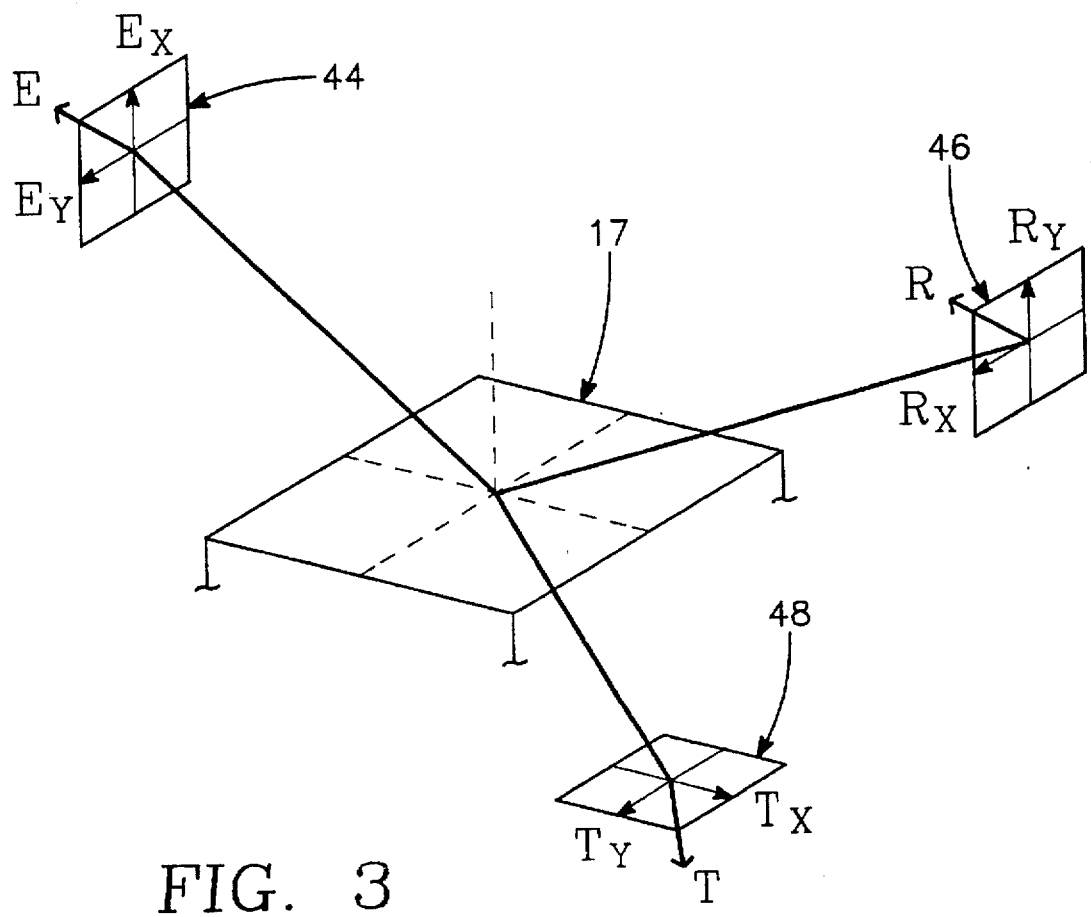
FIG. 3 is a schematic diagram illustrating the electromagnetic field intensity, the reflectance and the transmittance of infrared radiation incident upon the dielectric of FIG. 1.

Referring now to FIGS. 1, 2 and 3, the rays 40 reaching the surface 17 of dielectric 16 must be approximately parallel since the output image intensities are dependent on the angle of incidence φ at the surface 17 of dielectric 16. When the rays 40 of the incoming infrared radiation reach the surface 17 of dielectric 16 a portion of each ray 40 is reflected from dielectric 16 and the remainder each of ray 40 is transmitted into the dielectric 16. Any rays 40 transmitted into dielectric 16 are refracted at an angle θ which is determined from the following expression (which is Snell's Law):

$$\sin \phi = \sin \phi' \qquad (1)$$

where n is the index of refraction of dielectric 16. The effect of refraction is reasonably independent of wavelength throughout the infrared (from about one micron to about twenty microns) since the variance of n is minimal in this band.

Both the reflected beam (illustrated, for example, as rays 26 in FIG. 1) and the transmitted beam 42 of each incoming ray 40 are partially polarized. To calculate the degree of polarization, the incoming infrared radiation is represented as an electromagnetic field (designated generally by the reference numeral 44) with two perpendicular intensity components $E_x$ and $E_y$.

The fraction of each component $E_x$ and $E_y$ which is reflected is calculated in accordance with the following equations:

$$\frac{R_x}{E_x} = \frac{\sin(\phi - \phi')}{\sin(\phi + \phi')} \qquad (2)$$

$$\frac{R_y}{E_y} = \frac{\tan(\phi - \phi')}{\tan(\phi + \phi')} \qquad (3)$$

The fraction of the field intensity of the incoming infrared radiation which is transmitted into dielectric 16 is calculated in accordance with the following equations:

$$\frac{E_x'}{E_x} = \frac{2\sin(\phi')\cos(\phi)}{\sin(\phi + \phi')} \qquad (4)$$

$$\frac{E_y'}{E_y} = \frac{2\sin(\phi')\sin(\phi)}{[\sin(\phi + \phi')\cos(\phi - \phi')]} \qquad (5)$$

It should be noted that equations 2, 3, 4 and 5 are Fresnel's equations.

It should also be noted that infrared imagers (such as the infrared imager 20 depicted in FIG. 1) are generally insensitive to polarization. The X and Y components of the electric field can be recombined to calculate the field amplitude of the reflected images. The relative amplitude R (designated generally by the reference numeral 46) of a single reflection (the fraction of the incoming infrared energy which comprises a reflected beam such beam 26 of FIG. 1) is the square of its relative intensity as expressed in the following equation:

$$R = \left(\frac{R_X}{E_X}\right)^2 + \left(\frac{R_Y}{E_Y}\right)^2 \qquad (6)$$

The relative amplitude T (designated generally by the reference numeral 48) of that portion 42 of incoming ray 40 which is transmitted into dielectric 16 is calculated in accordance with the following equations:

$$T = \left(\frac{E_X'}{E_X}\right)^2 + \left(\frac{E_Y'}{E_Y}\right)^2 \qquad (7)$$

When beams 28 and 34 reach the rear surface 19 of dielectric 17, coating 18 will reflect approximately 0.96 percent of each beam without affecting polarization. If coating 18 were not present transmission losses from the rear of dielectric 16 would be significant.

From the foregoing description, it may readily be seen that the present invention comprises a new, unique and exceedingly useful blackbody simulating apparatus for calibrating an infrared imaging device which constitutes a considerable improvement over the known prior art. Obviously, many modifications and variations of the present invention are possible in light of the above teachings. It is, therefore, to be understood that within the scope of the appended claims the invention may be practiced otherwise than as specifically described.

What is claimed is:

1. A blackbody simulating apparatus for calibrating an infrared imaging device comprising:
   infrared energy generating means for generating and emitting infrared energy along a first optical path;
   collimating means positioned on said first optical path downstream from said infrared energy generating means, said collimating means collecting said infrared energy emitted along said first optical path to form a first collimated beam of infrared energy, said collimating means directing said first collimated beam of infrared energy along a second optical path; and
   reflecting means positioned downstream from said collimating means along said second optical path, said reflecting means having first and second surfaces, said reflecting means providing a second collimated beam of infrared energy by reflecting a portion of said first collimated beam of infrared energy from the first surface thereof;
   said reflecting means providing at least a third collimated beam of infrared energy by reflecting a remaining portion of said first collimated beam of infrared energy from the second surface thereof;
   said reflecting means directing said second and third collimated beams of infrared energy along a third optical path to said infrared imaging device, said second and third collimated beams of infrared energy having different radiance levels to allow said infrared imaging device to be calibrated;
   said reflecting means comprising a dielectric plate having said first and second surfaces, said first surface of said dielectric plate being substantially parallel to said second surface of said dielectric plate, said reflecting means including a metallic coating affixed to the second surface of said dielectric plate, said metallic coating forming a mirror like surface at the second surface of said dielectric plate.

2. The blackbody simulating apparatus of claim 1 wherein said infrared energy generating means comprises a cavity type blackbody simulator.

3. The blackbody simulating apparatus of claim 1 wherein said dielectric plate comprises an infrared transmitting material selected from the group comprising germanium, silicon and zinc selenide.

4. The blackbody simulating apparatus of claim 1 wherein said dielectric plate has a dielectric constant of between about 1.5 and 2.5.

5. The blackbody simulating apparatus of claim 1 wherein said metallic coating comprises a reflective material selected from the group comprising aluminum and gold.

6. A blackbody simulating apparatus for calibrating an infrared imaging device comprising:
   a blackbody simulator for generating and emitting infrared energy along a first optical path;
   a collimator positioned on said first optical path downstream from said blackbody simulator, said collimator collecting said infrared energy emitted along said first optical path to form a first collimated beam of infrared energy, said collimator directing said first collimated beam of infrared energy along a second optical path;
   a dielectric plate positioned downstream from said collimator along said second optical path, said dielectric plate having a front surface and a rear surface, the front surface of said dielectric plate being substantially parallel to the rear surface of said dielectric plate, the front surface of said dielectric plate providing a second collimated beam of infrared energy by reflecting a portion of said first collimated beam of infrared energy; and
   a metallic coating affixed to the rear surface of said dielectric plate, said metallic coating forming a mirror like surface at the rear surface of said dielectric plate;
   said metallic coating at the rear surface of said dielectric plate providing a third collimated beam of infrared energy by reflecting a remaining portion of said first collimated beam of infrared energy;
   said dielectric plate directing said second and third collimated beams of infrared energy along a third optical path to said infrared imaging device, said second and third collimated beams of infrared energy having different radiance levels to allow said said infrared imaging device to be calibrated.

7. The blackbody simulating apparatus of claim 6 wherein said blackbody simulator comprises a cavity type blackbody simulator.

8. The blackbody simulating apparatus of claim 6 wherein said dielectric plate comprises an infrared transmitting material selected from the group comprising germanium, silicon and zinc selenide.

9. The blackbody simulating apparatus of claim 6 wherein said dielectric plate has a dielectric constant of between about 1.5 and 2.5.

10. The blackbody simulating apparatus of claim 6 wherein said metallic coating comprises a reflective material selected from the group comprising aluminum and gold.

11. A blackbody simulating apparatus for calibrating an infrared imaging device comprising:
    a cavity type blackbody simulator for generating and emitting infrared energy along a first optical path;
    a collimator positioned on said first optical path downstream from said blackbody simulator, said collimator collecting said infrared energy emitted along said first optical path to form a first collimated beam of infrared energy, said collimator directing said first collimated beam of infrared energy along a second optical path;
    a dielectric plate positioned downstream from said collimator along said second optical path, said dielectric plate having a front surface, a rear surface and a dielectric constant of between about 1.5 and 2.5, said dielectric plate being an infrared transmitting material selected from the group consisting of germanium, silicon and zinc selenide, the front surface of said dielectric plate being substantially parallel to the rear surface of said dielectric plate, the front surface of said dielectric plate providing a second collimated beam of infrared energy by reflecting a portion of said first collimated beam of infrared energy; and a metallic coating affixed to the rear surface of said dielectric plate, said metallic coating forming a mirror like surface at the rear surface of said dielectric plate, said metallic coating being a reflective material selected from the group consisting of aluminum and gold;

said metallic coating at the rear surface of said dielectric plate providing at least a third collimated beam of infrared energy by reflecting a remaining portion of said first collimated beam of infrared energy;

said dielectric plate directing said second and third collimated beams of infrared energy along a third optical path to said infrared imaging device, said second and third collimated beams of infrared energy having different radiance levels to allow said said infrared imaging device to be calibrated.

* * * * *